(12) United States Patent
Bouaziz et al.

(10) Patent No.: US 12,304,393 B2
(45) Date of Patent: May 20, 2025

(54) VIEW ADJUSTING MECHANISM AND ADJUSTING MEANS FOR SUCH A VIEW ADJUSTING MECHANISM

(71) Applicant: MCi (Mirror Controls International) Netherlands B.V., Woerden (NL)

(72) Inventors: François Roderik Henri Bouaziz, Rotterdam (NL); Paulus Gerardus Maria Van Stiphout, Woerden (NL); Stefan Fritz Brouwer, Schoonhoven (NL); Bastiaan Bartjan Maat, Groot-Ammers (NL); Anne Catharina Martha Bekker, Alphen aan den Rijn (NL); Tom Adriaan Jansen, Woerden (NL); Alex Lorier, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 664 days.

(21) Appl. No.: 17/600,051

(22) PCT Filed: Mar. 19, 2020

(86) PCT No.: PCT/EP2020/057647
§ 371 (c)(1),
(2) Date: Sep. 29, 2021

(87) PCT Pub. No.: WO2020/200819
PCT Pub. Date: Oct. 8, 2020

(65) Prior Publication Data
US 2022/0185187 A1 Jun. 16, 2022

(30) Foreign Application Priority Data

Mar. 29, 2019 (DE) .......................... 102019108303.6

(51) Int. Cl.
*B60R 1/28* (2022.01)
*B60R 1/00* (2022.01)
(Continued)

(52) U.S. Cl.
CPC ................ *B60R 1/28* (2022.01); *B60R 1/006* (2013.01); *B60R 1/072* (2013.01); *G02B 7/182* (2013.01); *G03B 17/561* (2013.01)

(58) Field of Classification Search
CPC ........... B60R 1/006; B60R 1/072; B60R 1/28; G02B 7/182
(Continued)

(56) References Cited

U.S. PATENT DOCUMENTS 5,042,932 A * 8/1991 Pent .................... B60R 1/072
359/877
5,467,230 A * 11/1995 Boddy ................. B60R 1/068
248/479

(Continued)

FOREIGN PATENT DOCUMENTS

CN 102653248 A 9/2012
CN 107074131 A 8/2017
(Continued)

*Primary Examiner* — Ricky D Shafer
(74) *Attorney, Agent, or Firm* — Volpe Koenig (57) ABSTRACT

The invention relates to adjusting means for adjusting the position of a first part, in particular a viewing means holder part for a viewing means, such as a mirror or a camera for example, relative to a second part, in particular a base part, comprising at least one actuator, via which the first part can be moved, in particular pivoted, relative to the second part. The actuator has at least one first toothed ring segment and at least one second toothed ring segment, wherein the first toothed ring segment is force-coupled to at least one first actuator—in particular, a position detector—and the second toothed ring segment is force-coupled to at least one second
(Continued)

actuator—in particular, an actuating drive. The invention additionally relates to a view adjusting means comprising such an adjusting means.

11 Claims, 5 Drawing Sheets

(51) Int. Cl.
  *B60R 1/072* (2006.01)
  *G02B 7/182* (2021.01)
  *G03B 17/56* (2021.01)
(58) Field of Classification Search
  USPC ............................................ 359/877
  See application file for complete search history.

(56) References Cited

U.S. PATENT DOCUMENTS

| | | | | |
|---|---|---|---|---|
| 6,341,536 | B1* | 1/2002 | Guttenberger | B60R 1/072 |
| | | | | 74/502.1 |
| 6,929,374 | B2* | 8/2005 | Brouwer | B60R 1/072 |
| | | | | 359/872 |
| 6,971,757 | B2* | 12/2005 | Ro | B60R 1/072 |
| | | | | 359/872 |
| 6,997,569 | B2* | 2/2006 | Brouwer | B60R 1/072 |
| | | | | 359/877 |
| 7,320,527 | B2* | 1/2008 | Yamada | B60R 1/072 |
| | | | | 359/872 |
| 7,765,642 | B2 | 8/2010 | Fukuo | |
| 8,157,468 | B2* | 4/2012 | Lynn | B60R 1/072 |
| | | | | 403/152 |
| 10,017,119 | B2* | 7/2018 | Chong | B60R 1/072 |
| 10,227,044 | B2* | 3/2019 | Brouwer | F16H 19/04 |
| 2006/0265864 | A1 | 11/2006 | Fukuo | |
| 2016/0264055 | A1 | 9/2016 | Chong | |
| 2017/0240114 | A1* | 8/2017 | Brouwer | B60R 1/072 |

FOREIGN PATENT DOCUMENTS

| | | |
|---|---|---|
| CN | 107509386 A | 12/2017 |
| CN | 107554682 A | 1/2018 |
| CN | 207034111 U | 2/2018 |
| DE | 3244795 A1 | 6/1984 |
| DE | 3324949 A1 | 1/1985 |
| DE | 9319513 U1 | 3/1994 |
| DE | 101 59 705 A1 | 6/2003 |
| DE | 102017003118 A1 | 10/2018 |
| EP | 0170155 A1 | 2/1986 |
| JP | 2011-102066 A | 5/2011 |
| JP | 2013-052781 A | 3/2013 |
| JP | 2017-530046 A | 10/2017 |
| JP | 2017-530047 A | 10/2017 |
| JP | 2017-537014 A | 12/2017 |
| KR | 20170057305 A | 5/2017 |
| WO | 2016/048139 A1 | 3/2016 |

* cited by examiner

VIEW ADJUSTING MECHANISM AND ADJUSTING MEANS FOR SUCH A VIEW ADJUSTING MECHANISM

CROSS REFERENCE TO RELATED APPLICATIONS

This application is a 35 USC § 371 National Stage application of International Patent Application No. PCT/EP2020/057647, which was filed Mar. 19, 2020, entitled "VIEW ADJUSTING MECHANISM AND ADJUSTING MEANS FOR SUCH A VIEW ADJUSTING MECHANISM" which claims priority to German Patent Application No. DE 102019108303.6, filed Mar. 29, 2019 and is incorporated herein by reference as if fully set forth.

DESCRIPTION

The present invention relates to an adjusting means for adjusting the position of a first part—in particular, of a viewing means holder for a viewing means such as, for example, a mirror or a camera—relative to a second part—in particular, a base part—comprising at least one actuator via which the first part can be moved and, in particular, pivoted relative to the second part.

The present invention further relates to a view adjusting mechanism—in particular, for a side mirror or a camera unit of a motor vehicle—comprising the above first and second parts as well as a corresponding adjusting means.

Such adjusting means or view adjusting mechanisms are known from the prior art. They serve, among other things, to adjust a viewing means—for example, a mirror or a camera unit on a vehicle. The adjustment is usually motor-driven, but can also take place manually. For this purpose, a corresponding actuating drive is usually provided which allows a movement of the first part relative to the second part, and thus of the viewing means Usually, the first part is designed to pivot relative to the second part; however, other movements between the first part and the second part are also conceivable.

It is sometimes desired to provide a position detector in such adjusting means or view adjusting mechanisms which allows the detection of the positions of the first part relative to the second part, and, in particular, of a pivot angle between the first and second parts. A detected position can, for example, be fed to a memory unit and stored there in order to, optionally, play it back again at a later point in time. In this way, for different users, a special viewing means alignments, e.g., a mirror position, etc., can be stored and automatically set again after a user change, among other things. Special viewing means alignments, e.g., for maneuvering operation, driving operation, parking operation, etc., can also be stored and adjusted.

A number of exemplary embodiments of the above adjusting means and viewing means adjusting mechanisms are known from the prior art, which, however, in most cases have a very complex and therefore mostly space-consuming structure.

DE 10 2017 003 118 A1 describes a pivoting device for pivoting a first part relative to a second part, in which at least two toothed rings are arranged on a curved toothed rack, each of which is in operative connection with different gears. The detection of the relative positions is not covered.

The object of the present invention is thus to provide an adjusting means or a view adjusting mechanism which allows a simple—optionally, small—structure with very precise position detection.

This object is achieved by an adjusting means and a view adjusting mechanism according to the independent claims.

In particular, this object is achieved by an adjusting means for adjusting the position of a first part, namely a viewing means holder part for a viewing means, relative to a second part, namely a base part, comprising: at least one actuator via which the first part is movable, and in particular pivotable, relative to the second part, wherein the actuator has at least one first toothed ring segment and at least one second toothed ring segment, wherein the second toothed ring segment is force-coupled to at least one actuator, namely, an actuating drive so that the first part can be moved relative to the second part via the actuating drive, and wherein the first toothed ring segment of the actuating element is force-coupled to at least one detector, namely a position detector, wherein the first toothed ring segment is in a force-coupling state with a first pinion that drives the position detector, in which a detection signal is initiated via the applied movement, by means of which detection of the position of the first part relative to the second part is possible.

Moreover, this object is achieved by a view adjusting mechanism—in particular, for a side mirror or a camera unit of a motor vehicle—comprising a first part—in particular, a viewing means holder part for a viewing means such as, for example, a mirror or a camera—and a second part arranged so as to be movable and, in particular, pivotable relative thereto—in particular, a base part—and at least one adjusting means as described herein.

The core of the invention is, among other things, the use of at least one actuator having a first toothed ring segment and a second toothed ring segment, each of which operates different actuators and detectors, namely actuators and position detectors. Within the scope of the invention, an actuator is understood to mean a component that can initiate a movement. A detector is understood to mean a component that can initiate a signal. A detector is thus a position detector, in which a detection signal is initiated via an applied movement. Within the scope of the invention, an actuator is an actuating drive in which a movement, and, in particular, an adjusting movement, acting between the first and the second parts is initiated via an adjusting signal.

It should be mentioned that, as mentioned at the outset, the second part may optionally also be a viewing means holder part for a viewing means, and the first part may be a base part.

The same optionally also applies to the force-coupling between the first toothed ring segment and the position detector or the second toothed ring segment and the actuating drive. Instead of the position detector, an actuating drive can be provided and a position detector can be provided instead of the position detector.

The above means that the components discussed herein can optionally be formed on the first part and/or on the second part.

The use of an actuator with a first and second toothed ring segment makes the space-saving manufacture of the adjusting means easier and also takes into account a high accuracy in position detection.

Optionally, the actuator is mounted in a stationary and/or articulated manner on the first part and/or the actuating drive is mounted on the second part. In this way, a direct force-coupling can be created between the second part and the first part via a force-coupling between the actuating drive and the actuator. By means of the actuating drive, the first part can be moved, and in particular pivoted, relative to the second part. Optionally—particularly in this context—the first part is mounted in an articulated manner on the second part, and, in particular, pivotably thereto.

The actuator is, in particular, designed as a push rod and, in particular, in a circular arc shape. The first part can thus be moved relative to the second part via a movement, and, in particular, an axial movement, of the push rod—in particular, in its direction of skin extension. Optionally, the mounting point of the push rod is arranged on the first and/or second part outside the rotation point between the first and second parts. The design of the of the actuator or the push rod in a circular arc shape facilitates the incorporation—as will be described below—of the aforementioned first and second toothed ring segments and the coupling to the respective actuator or detector.

Optionally, the actuator is designed to pivot about at least one first axis. The first part can be moved to the second part via the pivoting.

Optionally, the first toothed ring segment and the second toothed ring segment are formed so as to be centered relative to the first axis. The first toothed ring segment and/or the second toothed ring segment preferably have a circular arc shape. The first toothed ring segment and the second toothed ring segment optionally have a common segment axis. This is understood to mean the respective axis about which the segment is bent. The segment axis is optionally the first axis. It is conceivable for the first toothed ring segment to have a radius different in length than the second toothed ring segment with respect to this first axis.

Optionally, the first toothed ring segment is a contrate gear segment and/or part of a contrate gearing. The advantage of such an embodiment is very accurate force coupling between the first toothed ring segment and the position detector, and thus very accurate position detection. In particular, in the design of the toothed ring segment such that it is part of a contrate gearing, movement of the position detector can take place in a very precise, space-saving, and error-redundant manner. In such an embodiment, a position signal is generated, optionally, by the movement initiated on the position detector via the toothed ring segment. This is possible, in particular, if the position detector has, optionally drives, a potentiometer. A position signal, which reflects the position of the first part relative to the second part, can thus be generated via a movement of the toothed ring segment.

The first toothed ring segment is force-coupled to and, in particular, in direct gearing with a first pinion and, in particular, a first involute pinion. The result—in particular, in combination with a first toothed ring segment designed as a contrate gear segment—is a contrate gearing that ensures very accurate force-coupling between the adjusting means and the position detector. In addition, the advantages inherent in a contrate gearing come fully to bear.

Optionally, the first pinion is centered rotatably relative to a second axis, wherein the second axis is pivoted towards the first axis and, in particular, extends perpendicularly thereto. A straight gearing and a helical gearing between the first pinion and the first toothed ring segment are also included here. Optionally, the first pinion actually has a tooth angle not equal to 0° or equal to 0°. Optionally, the second axis does not intersect the first axis. Optionally, the second axis lies in a plane which is pivoted in relation to the first axis, and, in particular, optionally, in a plane which is orthogonal to the first axis.

The advantage of a contrate gearing is, inter alia, that an axial orientation of the second pinion can be designed variably. The second pinion can thus be displaced axially along the second axis in certain regions. These and additional advantages result in particular from the design of the second pinion as an involute pinion.

Optionally—particularly in the case of the aforementioned contrate gearing or the toothed ring segment designed as a contrate gear segment—the actuator, and, in particular, the arc-shaped actuator, extends within an actuator plane, wherein the teeth of the first toothed ring segment are arranged perpendicularly thereto. Optionally, the teeth have the same modulus, but different pressure angles, along their tooth width.

As mentioned, the advantage of such a contrate gearing is that the axial mounting of the pinion can, in certain regions, be freely adjusted. Optionally, the gearing is designed in such a way that force transmission remains constant, given, in certain regions, a variable distance. As a result, the distance between the second axis, i.e., the pinion axis of the first pinion, relative to the top plane of the crown gear, i.e., here, the plane of the first toothed ring segment, can optionally be designed variably in certain regions. Optionally, the gearing is designed in such a way that, at a variable distance, the transmission remains constant. It is conceivable to design the first pinion and/or the first toothed ring segment to be straight or diagonally-toothed. With regard to the design of contrate gearings, reference is explicitly made to the following publication: Karlheinz Roth—Zahnradtechnik—Evolventen-Sonderverzahnungen zur Getriebeverbesserung, Springer—ISBN 3-540642366, pp. 305 et seqq.

Optionally, a 90° gearing of the first tooth segment relative to the first pinion thus applies to the second axis optionally extending perpendicularly to the first axis. Here, too, a straight gearing or a helical gearing can be used.

Optionally, the first pinion is centered relative to a second axis $A_2$ and, in particular, rotatable, wherein the second axis $A_2$ has a pivot angle of $\alpha > 0°$, and, in particular, preferably $\alpha = 90°$, relative to the first axis $A_1$.

The first pinion drives the position detector. Basically, and particularly in this context, the position detector can comprise a potentiometer which is driven via this first pinion. The position detector may comprise at least one position sensor—in particular, a potentiometer—a Hall sensor, an inductive sensor, a light sensor, an optical sensor, or any other type of sensor.

Optionally, the first pinion has or is operatively connected to at least one contact wiper that is connected to at least one—in particular, annular—contact track, and, in particular, a carbon contact track, on a circuit board of the potentiometer. Via the connection between contact wiper and contact track, the position of the contact wiper relative to a zero position can be detected potentiometrically, and a direct conclusion can thus be drawn as to the positioning of the actuator.

In particular, the optional design of the circuit board with integrated (carbon) contact track, which is preferably designed as a printed contact track, is especially advantageous here. The circuit board is also preferably a printed circuit board—for example, a PGB. The contact wiper is, optionally, force-coupled as an independent component to the first pinion and is, in particular, centered relative to the second axis of the first pinion. Optionally, the contact wiper moves together with the first pinion, wherein it is optionally arranged in such a way that it wipes along the contact track, and thus allows a position detection via the potentiometer. The annular contact track is optionally centered relative to the second axis and is, in particular, designed such that it runs around the second axis. In particular, it is designed in such a way that it is arranged below the first pinion, wherein the contact wiper is formed between the first pinion and the contact track. Optionally, the first pinion is formed with its second axis in such a way that it penetrates the circuit board and is held in a position device. Optionally, at least two contact tracks are provided, which are connected to one another via the contact wiper. The at least two contact tracks are optionally designed coaxially as arcs.

Optionally, the second toothed ring segment is an internal involute toothed ring segment or an external involute toothed ring segment and/or part of an involute gearing. Optionally, it is also conceivable for the second toothed ring segment to be force-coupled to and, in particular, in direct gearing with a second pinion and, in particular, a second involute pinion. It is possible to couple the second toothed ring segment to the actuating drive such that there is a force-coupling between second toothed ring segment and actuating drive via an involute gearing. Optionally, the actuating drive is designed as a servomotor, so that it brings about an adjustment of the adjusting means via a drive signal, and thus an adjustment of the first part relative to the second part. Such a servomotor is preferably an electric motor.

Optionally, the second pinion is centered relative to a third axis, which optionally runs parallel to the first axis. In this way, a very compact adjusting means can be achieved.

As mentioned at the outset, the present application relates not only to an adjusting means, but also to a view adjusting mechanism, as mentioned above. For reasons of redundancy, the individual features and embodiments of such a view adjusting mechanism will not be discussed in detail, but reference will be made to the features mentioned in connection with the adjusting means They are to be applied identically to the view adjusting mechanism.

Further embodiments of the invention result from the dependent claims.

Hereinafter, the invention will be described with reference to exemplary embodiments, which are explained in more detail by the accompanying drawings. In the figures.

In the following, the same reference numbers are used for identical and identically-acting components, wherein superscripts can sometimes be used.

Unless otherwise defined, all terms used herein (including technical and scientific terms) have the same meaning and, in particular, have a meaning as generally understood by an average person skilled in the art from this field when interpreted in connection with the description and drawings.

It is further understood that terms, such as those defined in commonly-used dictionaries, will be interpreted in reference to the technical field relevant here, and not in an idealized or forced formal sense, unless explicitly so defined. In certain cases, a detailed description of generally known devices and methods may be omitted in order to avoid redundancy in the description. The description of particular embodiments and the terminology used therein are not intended to limit the invention. The singular forms, "a" or "the," may also include the plural forms, unless the context clearly indicates otherwise. The expression, "and/or," includes any and all combinations of one or more of the associated listed items. It is understood that the terms, "comprises" and/or "comprising," indicate the presence of stated features, but do not preclude the presence or addition of one or more other features. Furthermore, it is to be understood that, if a particular step of a method is indicated as following another step, it may directly follow that other step, or one or more intermediate steps, may be carried out before the particular step is carried out, unless otherwise indicated. In the same way, it is to be understood that, if a connection between structures or components is described, this connection may take place directly or via intermediate structures or components, unless otherwise specified. Reference is made to the entire disclosure content of all publications, patent applications, patents, and other literature mentioned here. In the event of a conflict, the present specification, including its definitions, applies.

The invention is described here with reference to the accompanying drawings, which show embodiments of the invention. However, the invention may also be embodied in many different forms and should not be understood as being limited to the embodiments set forth here. Rather, the embodiments are given here so that the present disclosure is detailed and complete and explains the scope of the invention to the person skilled in the art in a complete, but exemplary, manner. The description of the exemplary embodiments shall be read in connection with the accompanying drawings, which shall be considered part of the entire written description. In the drawings, it may happen that the absolute and incidental sizes of systems, components, layers, and regions are exaggerated for the sake of clarity. Embodiments may be described on the basis of schematic and/or cross-sectional illustrations, idealized embodiments, and intermediate structures of the invention. Relative terms as well as their derivations should be understood as relating to the orientation as described or shown there in the drawing just discussed. These relative terms are for the sake of clarity of description and do not require the system to be set up or operated in a specific orientation, except as explicitly stated otherwise. Any of the disclosed devices or parts thereof may be combined together or divided into further parts, unless specifically stated otherwise. The mere fact that certain measures are listed in sections or claims that differ from one another is not intended to indicate that a combination of these measures cannot advantageously be carried out. In particular, all conceivable combinations of the claims are to be considered inherently disclosed. In this description, words such as "substantially," "approximately," or "generally" should be interpreted to mean that they contain at least deviations in dimension of 10% or less—preferably 5% or less—or deviations from a form that would still fall within the scope of the respective definition for a person skilled in the art, except as stated otherwise.

For reasons of clarity and in the sense of a stringent description, features are usually described here as part of one or separate embodiments; however, it goes without saying that the scope of the invention may also contain embodiments that show combinations of all or some of the described features.

Figures 1, 2:
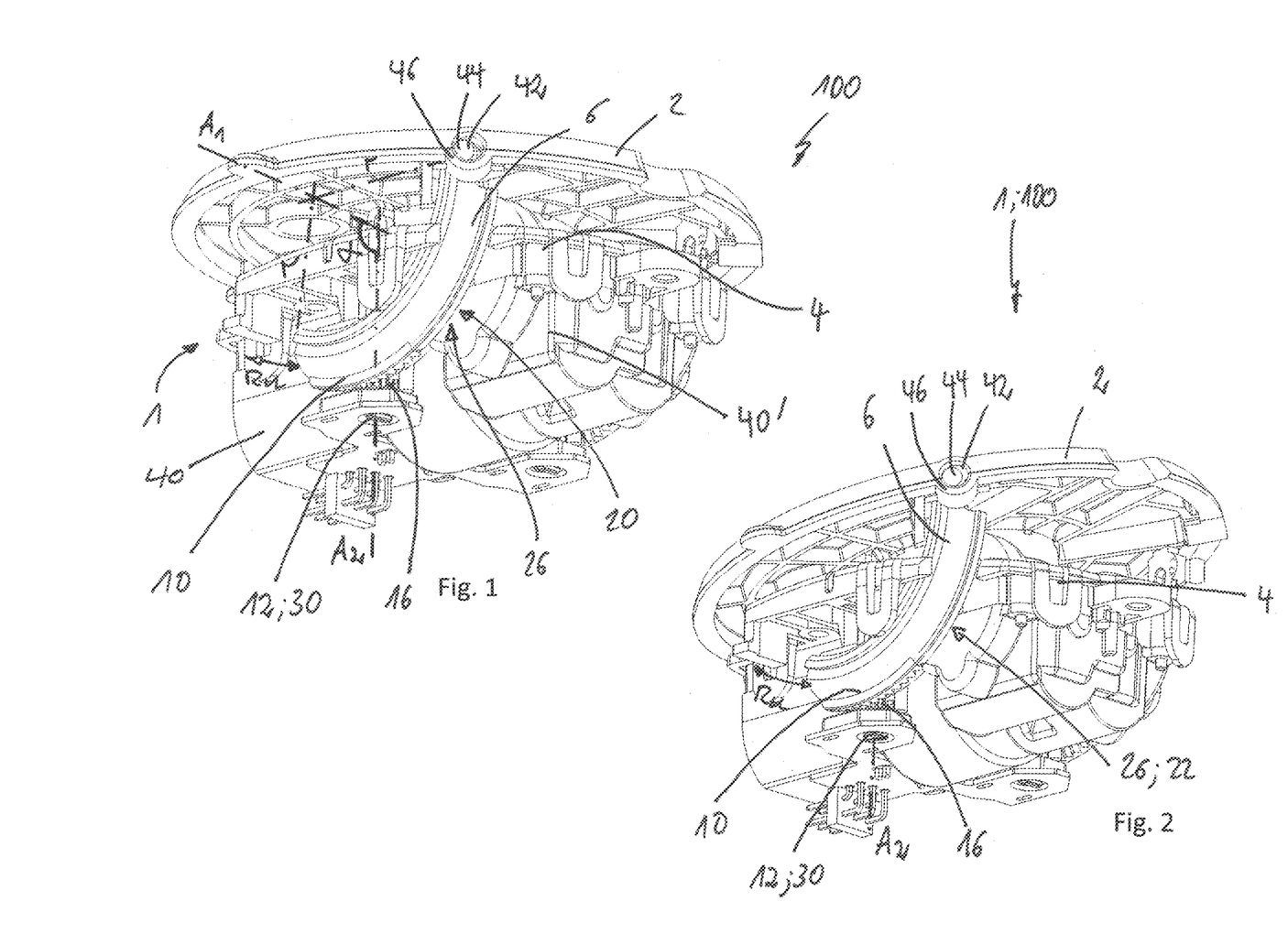
FIGS. 1 and 2 show spatial representations of an embodiment of a view adjusting mechanism according to the invention in different pivot states.
Figures 3, 4:
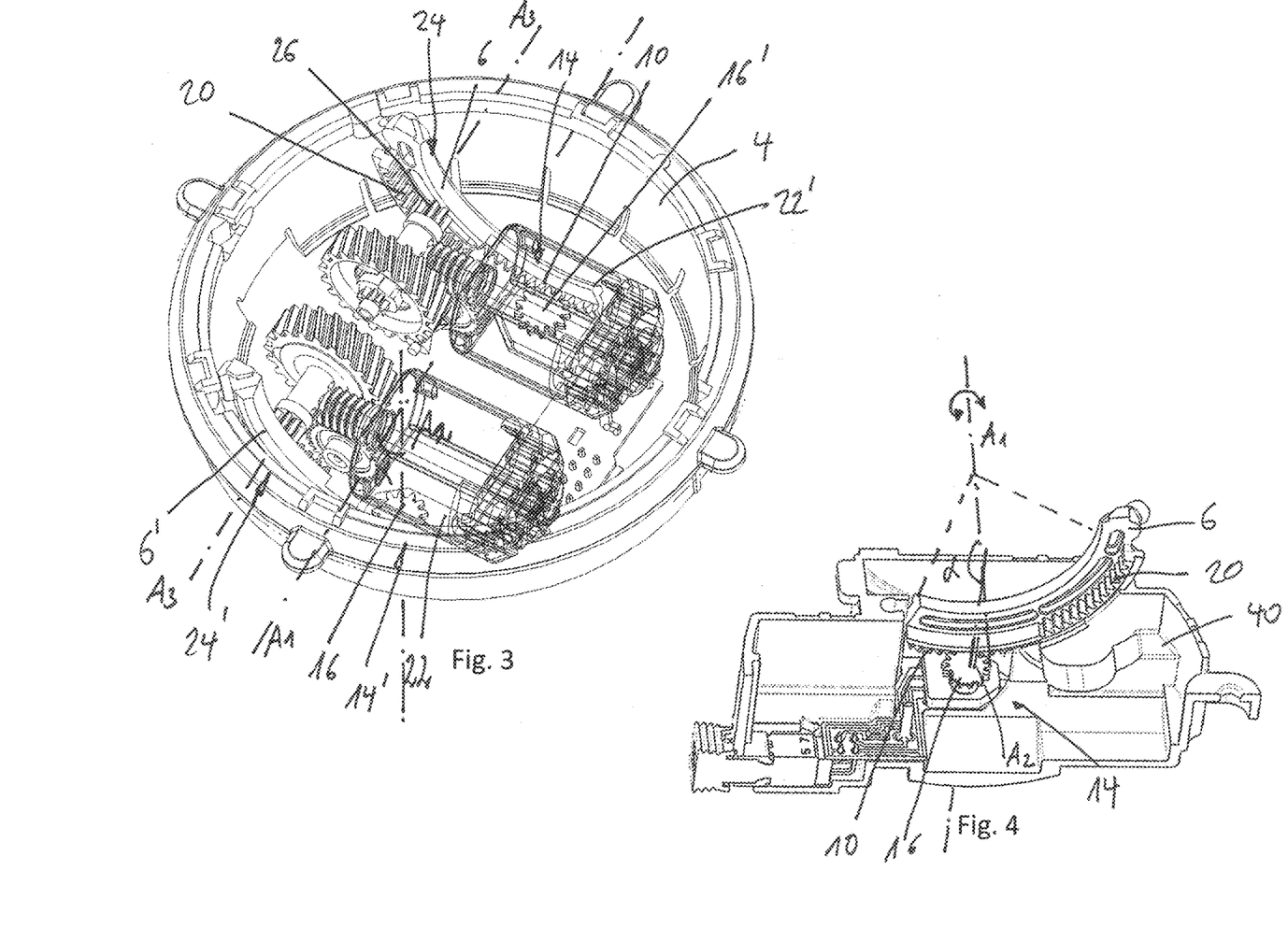
FIG. 3 shows another spatial cutaway representation of the view adjusting mechanism according to FIG. 1
FIG. 4 shows a spatial detailed representation of an embodiment of the adjusting means according to the invention.

FIGS. 1 to 3 show three spatial representations of an embodiment of the adjusting mechanism 100 according to the invention or of an embodiment of the adjusting means 1 according to the invention. In FIG. 3, certain components have been removed for better visibility.

The view adjusting mechanism 100 comprises a first part 2—namely, a viewing means holder part for a viewing means, such as a mirror or a camera—and a second part 4—namely, a base part—arranged so as to be movable and, in particular, pivotable relative thereto. This base part can, for example, be attached to a vehicle in a stationary manner. At least one adjusting means 1 is provided between the second part 4 and the first part 2, which adjusting means serves, inter alia, to pivot the first part 2 relative to the second part 4. Optionally, two adjusting means 1 are provided in this embodiment.

The adjusting means 1 comprises an actuator 6 via which the first part 2 can be moved, and, in particular, pivoted, relative to the second part 4. The actuator is force-coupled between the first and the second part. Optionally, a plurality of such actuators is provided.

As shown in particular in FIGS. 1 through 9, the actuator 6 comprises a first toothed ring segment 10 and a second toothed ring segment 20. The first toothed ring segment 10 is force-coupled to at least one detector 12, namely a position detector, and the second toothed ring segment 20 is force-coupled to at least one actuator 22, namely an actuating drive. The actuating drive 22 (see, in particular, FIG. 3), can be used to move the actuator in such a way as to cause a movement between first part 2 and second part 4. In this embodiment, two actuators 6 are optionally provided, each coupled to an actuating drive 22.

As shown in FIG. 3, the at least one actuating drive 22 is optionally force-coupled to the actuator 6 in such a way that an activation of the actuating drive 22 leads to a movement of the actuator 6, and, in particular, to its pivoting about the axis $A_1$ shown in FIG. 1. A corresponding direction of movement is shown—inter alia, also in FIG. 7—by arrow 8, relating to a pivoting direction of the actuator 6.

For pivoting, the actuator 6 optionally has, as the second toothed ring segment 20, an internal toothed ring segment, and, in particular, an internal involute toothed ring segment, which is force-coupled to and, in particular, in direct gearing with a second pinion 26, wherein this second pinion 26 is force-coupled to the actuating drive 22. Optionally, the second toothed ring segment 20 is designed as an involute toothed ring segment and, here, in particular as an internal involute toothed ring segment. It is also conceivable to design the second toothed ring segment 20 as an external involute toothed ring segment. Second pinion 26 and second toothed ring segment 20 optionally form an involute gear 24.

The second pinion 26 is optionally centered relative to a third axis $A_3$, which optionally runs parallel to the first axis $A_1$ about which the actuator 6 can be centered and/or pivoted.

The design of the internal gearing or internal toothed ring segment 20 is also shown in detail in FIGS. 3 through 7. The optional involute design of the toothing comprising the teeth 28 and the formation of the second toothed ring segment 20 on the actuator 6 can be seen.

Figure 7:
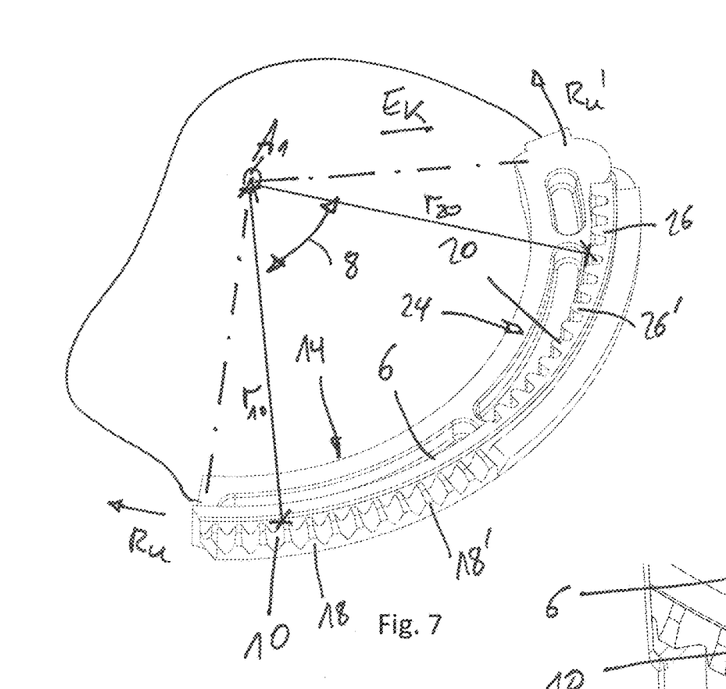
FIG. 7 shows a detailed representation of an embodiment of an actuator.
Figure 8:
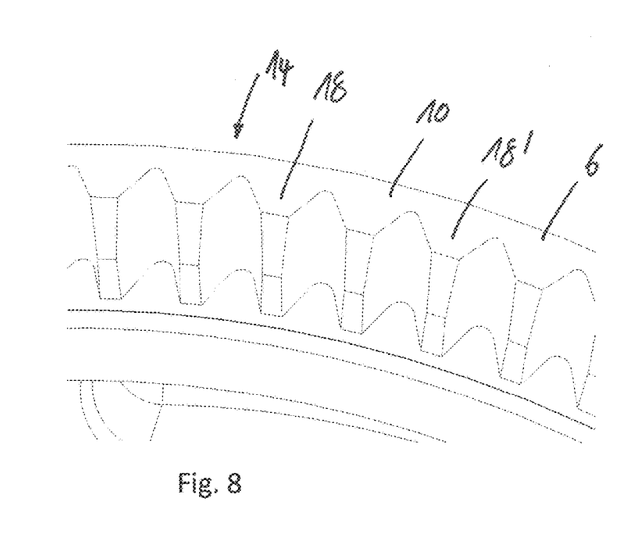
FIG. 8 shows a detailed representation of a first toothed ring segment of the actuator shown in FIG. 7.
Figure 9:
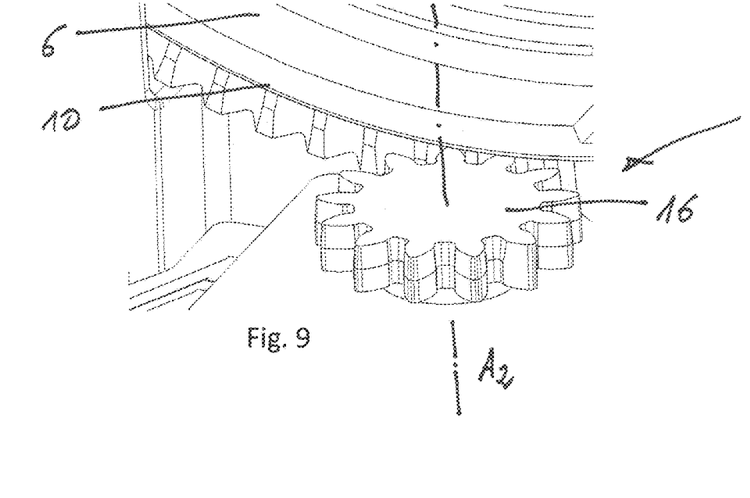
FIG. 9 shows a further detailed representation of the actuator according to FIG. 7 in accordance with an arrangement according to FIG. 4.

As shown, in particular, in FIG. 7, the actuator 6 is optionally designed as a circular arc and, further, optionally as a push rod. In this embodiment, it optionally forms a circular arc about the first axis $A_1$. Further, optionally, in this embodiment, the second toothed ring segment 20 and the first toothed ring segment 10 are centered about this axis $A_1$. The first toothed ring segment and the second toothed ring segment thus optionally form a circular arc about the axis $A_1$, and, in particular, about the common axis $A_1$. They optionally have different radii $r_{10}$ or $r_{20}$ with respect to the first axis. The reference symbol $E_{KR}$ shown in FIG. 7 shows the plane of extension of the actuator 6 and, in particular, the top plane of the contrate gear, i.e., here, the plane of the first toothed ring segment 10.

As shown in particular in FIGS. 1 and 2, the actuator 6 is optionally mounted in a stationary and articulated manner on the first part 2. An engagement mounting 42 is provided for this purpose, wherein an engagement element 44 is provided on the actuator, and an engagement element receptor 46 is provided on the first part 2. The result is an articulated mounting, so that a pivoting movement at the first part 2 relative to the second part 4 results after an axial movement of the actuator 6 in its circumferential direction $R_U$. This axial movement is effected by the gearing 24 and the actuating drive 22.

As is also shown in FIGS. 1 through 9, in addition to the second toothed ring segment 20, the actuator 6 also comprises the first toothed ring segment 10 assigned to a detector 12, namely a position detector. With this embodiment, a position detection of the first part 2 relative to the second part 4 is possible. To this end, the first toothed ring segment 10 is force-coupled to and, in particular, in direct gearing with a first pinion 16 and, in particular, a first involute pinion. In this case, the first toothed ring segment 10 is optionally designed as a contrate gear segment with a plurality of teeth 18 and/or part of a contrate gearing 14. This embodiment is shown in detail in particular in FIGS. 6 to 9.

The first pinion 16 is optionally centered relative to a second axis $A_2$ and, in particular, rotatable, wherein the second axis $A_2$ has a pivot angle of $\alpha>0°$, and, in particular, preferably $\alpha=90°$, relative to the first axis $A_1$. This is shown in particular in FIG. 1 and in FIG. 3.

Figure 5:
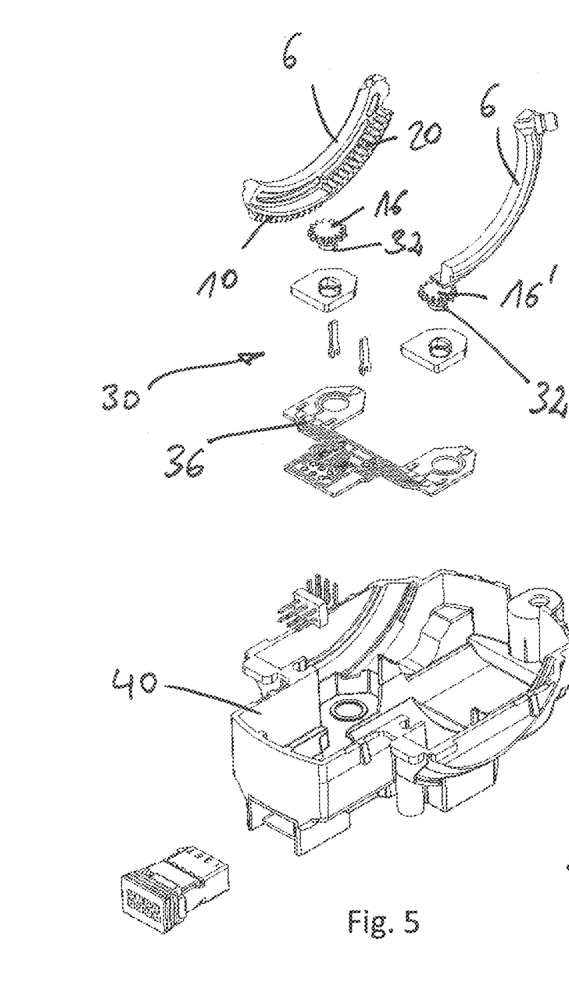
FIG. 5 shows a spatial exploded view of the adjusting means according to FIG. 4.
Figure 6:
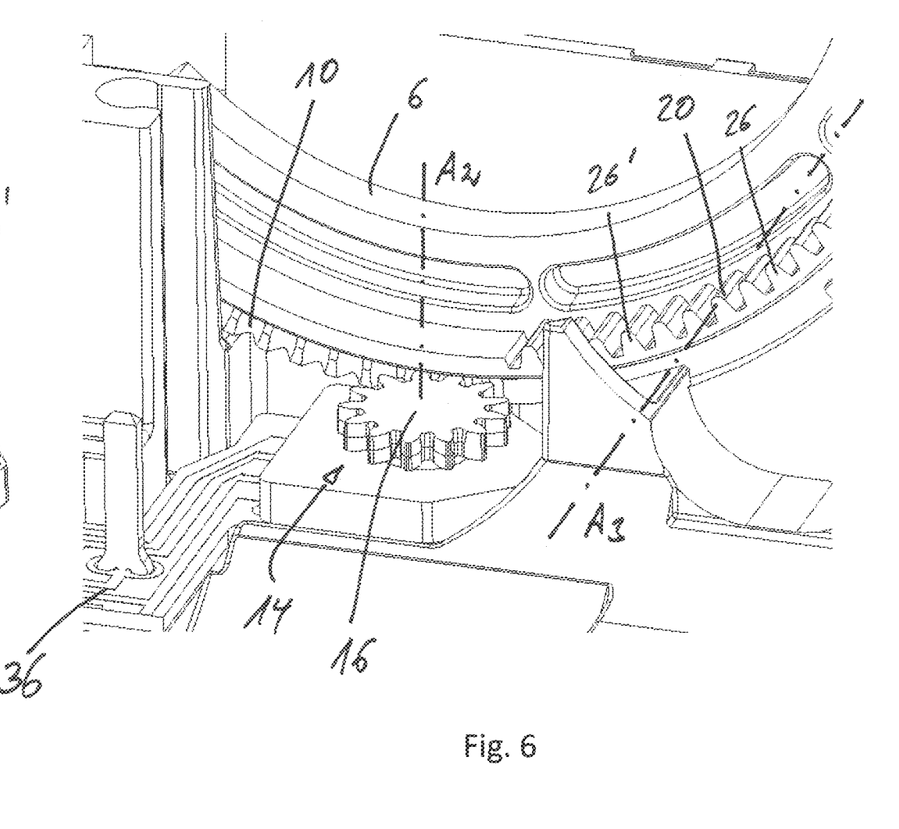
FIG. 6 shows another spatial detailed representation of the adjusting means according to FIG. 4.

As shown in detail in particular in FIGS. 4 to 6, the first pinion 16 is optionally designed so as to drive the position detector 12. The corresponding components are optionally covered by a housing 40.

Figure 10:
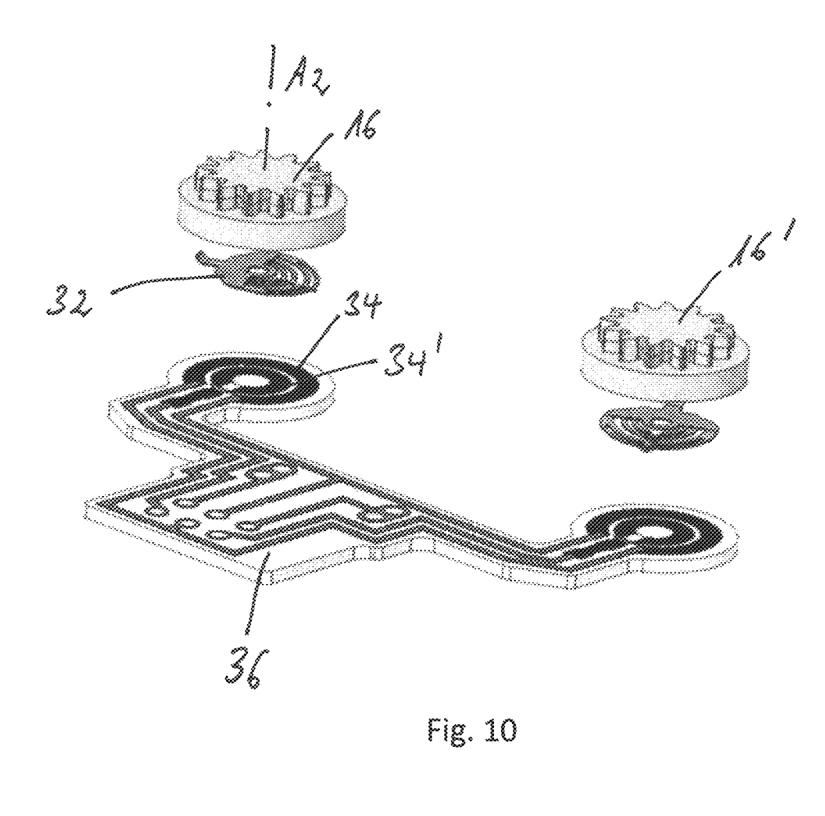
FIG. 10 shows an exploded view of an embodiment of a first actuator as can be used in the embodiment according to FIG. 1.

The position detector may comprise a potentiometer 30 driven via the first pinion 16. This is shown, for example, in FIG. 10. To this end, the first pinion 16 optionally has at least one contact wiper 32. It is also possible to provide a contact wiper 32 and to force-couple it to the first pinion 16 so that it moves—in particular, during a rotation of the first pinion 16—and, in particular, rotates with this first pinion 16. The contact wiper 32 is optionally connected to at least one annular contact track 34, and, in particular, a carbon contact track, on a circuit board 36 of the potentiometer 30. As a result of a rotation of the first pinion, the resistance value of the potentiometer changes when the contact wiper 32 travels on the contact track 34. In this way, position detection of the first pinion 16 and, in direct conclusion, position detection of the actuator 6, and thus of the position of the second part 4 relative to the first part 2, is possible. As shown in particular in FIG. 10, the annular contact track 32 is optionally centered relative to the second axis $A_2$. Here, annular means that the contact track 32 runs around at least one partial circle.

As already mentioned, the invention relates to a view adjusting mechanism and an adjusting means, wherein the aforementioned features may be provided both in a view adjusting mechanism and in an embodiment of the adjusting means.

REFERENCE SYMBOLS 1 adjusting means
2 first part
4 second part
6 actuator
8 pivoting direction
10 first toothed ring segment
12 detector, namely position detector
14 contrate gearing
16 first pinion
18 teeth
20 second toothed ring segment
22 actuator, namely actuating drive
24 involute gearing
26 second pinion
28 teeth
30 potentiometer
32 contact wiper
34 contact track
36 circuit board
40 housing
42 engagement mounting
44 engagement element
46 engagement element mounting
100 view adjusting mechanism
$A_1$ axis
$A_2$ axis
$A_3$ axis
$r_{10}$ radius
$r_{20}$ radius
$R_U$ pivoting direction
$E_{KR}$ actuator plane

The invention claimed is:

1. An adjusting means for adjusting a position of a first part relative to a second part, the adjusting means comprising at least one push rod that moves the first part relative to the second part, wherein:
the first part includes a holder part for a viewing means,
the second part includes a base part,
the push rod comprises at least one first toothed ring segment and at least one second toothed ring segment,
the second toothed ring segment is force-coupled to at least one actuating drive such that the first part can move relative to the second part via the actuating drive,
the first toothed ring segment of the push rod is force-coupled to at least one position detector, and
the first toothed ring segment is force-coupled to a first pinion which drives the position detector, wherein an applied movement initiates a detection signal to detect a position of the first part relative to the second part, wherein:
the push rod is designed to pivot about at least one first axis ($A_1$),
the first toothed ring segment and the second toothed ring segment are formed so as to be centered relative to the first axis ($A_1$),
the first toothed ring segment is a contrate gear segment or part of a contrate gearing,
the first pinion is a first involute pinion,
the second toothed ring segment is at least one of an internal involute toothed ring segment, an external involute toothed ring segment, or part of an involute gearing, and
the second toothed ring segment is force coupled with a second pinion, wherein
the second pinion is a second involute pinion, and
the first involute pinion is centered rotatably relative to a second axis ($A_2$).

2. The adjusting means according to claim 1, wherein
the actuating drive is mounted on the second part.

3. The adjusting means according to claim 2, wherein the push rod is mounted in a stationary and articulated manner on the first part and that the actuating drive is mounted on the second part.

4. The adjusting means according to claim 1,
wherein the second axis ($A_2$) has a pivot angle $\alpha=90°$ relative to the first axis ($A_1$).

5. The adjusting means according to claim 1 characterized in that
the position detector comprises at least one potentiometer which is driven via the first pinion.

6. The adjusting means according to claim 5, wherein the first pinion has at least one contact wiper or is operatively connected thereto, and the contact wiper is connected to at least one annular contact track on a circuit board of the potentiometer.

7. The adjusting means according to claim 6, wherein the annular contact track is centered relative to a second axis $A_2$.

8. The adjusting means according to claim 1 characterized in that
the push rod is designed to be pivotable about the at least one first axis $A_1$, and
the second pinion is centered relative to a third axis $A_3$ which runs parallel to the first axis $A_1$.

9. A view adjusting mechanism comprising the first part; the second part pivotable relative to the first part; and at least one adjusting means according to claim 1, wherein
the viewing means of the first part is a mirror or camera, and
the view adjusting mechanism is for a side mirror or a camera unit of a motor vehicle.

10. The adjusting means according to claim 1, characterized in that
the push rod is designed in a circular arc shape.

11. The adjusting means according to claim 1, wherein the second axis ($A_2$) has a pivot angle $\alpha>0°$ relative to the first axis ($A_1$).

* * * * *